United States Patent Office
3,529,016
Patented Sept. 15, 1970

3,529,016
N-(2-ALKYL)-SULFOACETAMIDES
Arno Cahn, Pearl River, N.Y., and Mark D. Konort,
Haworth, N.J., assignors to Lever Brothers Company,
New York, N.Y., a corporation of Maine
No Drawing. Continuation-in-part of application Ser. No.
536,646, Mar. 23, 1966, which is a continuation-in-part
of application Ser. No. 306,996, Sept. 6, 1963. This
application Feb. 2, 1968, Ser. No. 702,557
Int. Cl. C07c *143/14*
U.S. Cl. 260—513                              4 Claims

ABSTRACT OF THE DISCLOSURE

This application discloses as novel compounds the N-(2-alkyl)-sulfoacetamides of the formula

R—CH(CH$_3$)—NH—CO—CH$_2$—SO$_3$M where M is a water-solubilizing cation and R is a C$_9$–C$_{12}$ alphatic hydrocarbon group. The sulfoacetamides exhibit unusual value as dishwashing detergents and are unexpertedly soluble making possible the preparation of homogeneous, liquid concentrates. A method of synthesis is also disclosed in which a long chain alpha olefin is reacted with chloroacetonitrile. The resulting 2-alkyl chloroacetamide is converted to a sulfonate.

---

This is a continuation-in-part of our copending application Ser. No. 536,646, filed Mar. 23, 1966 (now abanboned), which is, in turn, a continuation-in-part of our patent application Ser. No. 306,996, filed Sept. 6, 1963 (now abandoned).

This invention relates to a novel process for the preparation of certain detergent compounds and to novel detergent compounds produced thereby.

In accordance with the present invention, a novel process has been discovered for the preparation of N-(2-alkyl)-sulfoacetamides of the formula:

R—CH(CH$_3$)—NH—CO—CH$_2$—SO$_3$M wherein R is a straight-chain aliphatic hydrocarbon radical of about 9 to 12 carbon atoms and M is a water-solubilizing cation, such as Na$^+$, K$^+$, NH$_4^+$, and substituted ammonium ions, e.g., triethanol-ammonium. Specific compounds falling within this class include sodium, potassium, ammonium and triethanol-ammonium N-(2-tetradecyl)-2-sulfoacetamides.

These sulfoalkanamides are mild to the skin and have been found to be particularly efficacious in liquid dishwashing detergent compositions. Moreover, they are rapidly biodegradable without an induction period. In addition, the compounds are useful as lime-soap dispersants, i.e., they have the property of dispersing insoluble calcium and magnesium soaps formed by the solution of water-soluble soaps in hard water. The sulfoacetamides are of particular advantage because of their high solubility, which simplifies the preparation of liquid detergent concentrates.

In accordance with the present invention the foregoing compounds may be prepared by reacting a chloronitrile of the formula Cl—CH$_2$—C≡N, with a long-chain alpha-olefin or mixtures thereof in the presence of concentrated sulfuric acid to give a N-(2-alkyl)-chloroacetamide and then sulfonating the N-(2-alkyl)-chloroacetamide to yield the desired sulfoacetamide.

The procedure is represented by the equations:

R—CH=CH$_2$ + Cl—CH$_2$—C≡N + H$_2$O ——→

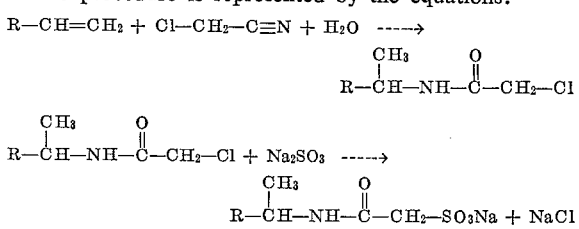

$$R-\overset{\underset{|}{CH_3}}{C}H-NH-\overset{\underset{\parallel}{O}}{C}-CH_2-Cl + Na_2SO_3 \longrightarrow$$

$$R-\overset{\underset{|}{CH_3}}{C}H-NH-\overset{\underset{\parallel}{O}}{C}-CH_2-SO_3Na + NaCl$$

The sodium sulfite mentioned in the foregoing reaction scheme may be replaced by any other appropriate alkaline sulfite, for example potassium sulfite, in accordance with well-known technology. As the nitrile, the halonitriles of halogens having an atomic weight from 35 to 127 may be used, i.e., chloro, bromo or iodo nitriles.

An important advantage of this method is that the starting materials are relatively inexpensive and are presently available in large supply. The 2-chloroacetonitrile may be prepared by methods known in the art.

The first step of the foregoing reaction will obviously consume one mole of each reactant (i.e. chloronitrile, alpha-olefin and water) for each mole of chloroacetamide produced. For convenience and commercial economy, one of the reactants, such as the olefin, will normally be used in a limiting amount.

Conditions for effecting the first step of the reaction follow the conditions which are known for the addition of a nitrile to a tertiary olefin. Typically, the reaction is carried out at a temperature at or below ambient temperature. Preferably, a temperature of —5° to +10° C. is used to facilitate temperature control, since the reaction is strongly exothermic.

The first step of the reaction scheme is typically carried out as a two-part reaction. In the first part, the olefin is reacted with the nitrile in the presence of a strong acid, such as sulfuric acid, to produce an olefin-nitrile-sulfuric acid addition product. One mole of acid is required for each mole of amide produced. In the second part of the reaction, water is added to the resulting addition product to produce the desired amide. The acid is recovered in diluted form. The addition of water in the second part of the reaction must normally be done with care to avoid a uncontrollable rise in temperature. Moreover, it is also good practice to combine the acid and the alpha-olefin slowly to facilitate the control of temperature during the first part of the reaction. The foregoing, as will be apparent, may be carried out in a single vessel or, if desired, in a plurality of successive reaction vessels. Appropriate continuous processing equipment may also be used.

The intermediate N-(2-alkyl)-chloroacetamides are obtained in satisfactory yields, which is surprising since the reaction between chloronitriles and olefins would be expected to give low yields of chloroamides. In the present invention, yields of 90% or more, based on the amount of olefin used, are obtained. Such yields are of great practical importance. Yields of 50% or less, which might have been expected based on the prior experience with this reaction, would have made the process which we have discovered an impractical method of preparing detergents on a commercial scale.

A still further advantage of the present invention is that the N-(2-alkyl)-chloroacetamides are insoluble in the aqueous acid reaction medium. Accordingly, they can be readily isolated from the first reaction mass prior to sulfonation by simple filtration or by melting to form a distinct phase.

Still another advantage of the novel method is that it can be readily adapted to provide an efficient commercial procedure for the preparation of the detergent compounds of this invention. More important, however, is the fact that this process yields N-(2-alkyl)-chloroalkanamide which are quite useful as intermediates for manufacturing detergents and detergent adjuncts. Thus, the intermediates can be sulfonated to form the sulfoalkanamide detergents of the present invention.

The intermediate chloroalkanamides prepared in accordance with the foregoing are converted into the corresponding sulfoalkanamides by reaction with an alkali sulfite, such as $Na_2SO_3$, $K_2SO_3$, $(NH_4)_2SO_3$, etc. The reaction with sulfites as illustrated in the second formula is a well-known process, and conventional reaction conditions are used. Typically, the reaction is carried out in an aqueous medum at elevated temperatures, i.e. 150°–200° C. Because of the elevated temperatures, it is necessary to carry the reaction out in pressure apparatus.

The following examples are given to illustrate the process of the present invention as well as the utility of the compounds prepared thereby.

EXAMPLE 1

A three liter 4-necked flask, equipped with an addition funnel, condenser, thermometer and stirrer, and containing sulfuric acid (96%; 4.4 mole; 431.6 g.) was cooled to −5° C. with stirring. While maintaining this temperature, chloroacetonitrile (1.2 mole; 90.6 g.) was added dropwise. To this cooled reaction mixture, 1-tetradecene (1.1 mole; 216.0 g.) was added dropwise while a temperature of −5° C. to 0° C. was maintained with external cooling. After the addition was completed the cooling bath was removed and the temperature of the reaction mixture allowed to rise slowly to 37° C. This temperature was maintained for 1 hour. The reaction flask was then cooled again to 0° C. and water (1650 ml.) added slowly at first (to avoid a sudden rise of temperature) and more rapidly as the acid solution became more dilute. The reaction mixture was stirred for 45 minutes. The granular product rose to the surface of the liquid and was separated by drawing of the spent acid.

The strongly acidic solid was washed with water and neutralized with a sodium carbonate solution, which was added very slowly to avoid excessive frothing due to $CO_2$ evolution. Stirring during the neutralization is necessary. Separation of the product was accomplished by heating in a water bath to melt the chloroamide and form a distinct upper layer. The aqueous portion was drawn off and on cooling, the melted chloroamide solidified (yield: 92.9% of theory, based on 1-tetradecene).

After removal of a small sample, the remaining chloroamide (0.849 mole; 275.6 g.) was treated with sodium sulfite (1.023 mole; 129.0 g.) in 333.4 g. of water in a Parr pressure apparatus. The system was heated and a temperature of 175° C. to 187° C. was maintained for about one hour. After cooling, the reaction product was obtained as a light orange-amber paste, containing 37.8% active. The overall yield was 79.3% of theory, based on the starting 1-tetradecene.

When crude chloroamide was prepared as described above, purified by distillation at 150°–152° C. at 0.4 mm., and sulfonated as described above, the paste which was obtained was white in color.

If desired, a purified solid sodium N-(2-tetradecyl)-2-sulfoacetamide can be obtained from the paste by extraction with hot isopropyl alcohol and precipitation with acetone.

As already mentioned, the compounds of this invention are particularly useful as dishwashing detergents. In such applications the compounds are used in aqueous solutions containing an effective amount of the detergent-active. Typical dishwashing solutions will contain at least about 0.5 gm. of active for each 6 quarts of water.

For commercial purposes, when marketing the sulfoacetamides of this invention as dishwashing detergents, they will be prepared as liquid concentrates in an essentially aqueous medium. It is an unexpected advantage of the present invention that the sulfoacetamides can be prepared in concentrates of commercially acceptable strength with only moderate amounts of solubilizing agents being required to formulate a homogeneous product. Typical detergent concentrates employing sulfoacetamides in accordance with this invention would have the following basic composition:

|  | Percent by weight |
|---|---|
| An N-(2-alkyl)-2-sulfoacetamide | 5 to 25 |
| A hydrotroping agent | 4 to 15 |
| Suds boosters | 0 to 14 |
| Vehicle consisting essentially of water, balance to make 100 | |

Typical hydrotroping agents useful in the present invention include the lower alkyl alcohols, such as ethyl or propyl alcohols, hexylene glycol, the lower molecular weight hydroxyalkyl N-methyl taurines (for example, having an alkyl group of 6–10 carbon atoms), and the benzene, xylene, toluene, and cumene sulfonates.

Suds boosters such as the well-known alkyl or alkylol amides described in U.S. Pat. No. 2,733,214 may also be included if desired, although their use is not an essential part of the present invention. These same amides may also function as builders.

The finished composition may also contain minor adjuvants and other additives such as colorants and perfumes, as desired, which do not alter the essentially aqueous nature of the vehicle.

As already mentioned, the sulfoacetamides prepared in accordance with the process of the present invention have particular utility as dishwashing detergents. In part, this utility is attributable to the exceptional solubility of the acetamides which makes possible the preparation of homogeneous liquid detergent concentrates. Moreover, the sulfoacetamides of the present invention (which characteristically have an alkyl group with a 1-methyl side chain) possess exceptional, and unexpected detergency over comparable sulfoacetamides lacking the 1-methyl side chain (i.e. completely linear compounds). This is illustrated by the following example:

EXAMPLE 2

Comparison of the N-(2-tetradecyl)-sulfoacetamide with its 1-tetradecyl isomer in a system containing coconut monoethanolamide as a suds booster demonstrates the unexpected properties of the 2-alkyl compounds.

TABLE I

| Formula Number | 1 | 2 |
|---|---|---|
| Sodium N-(2-tetradecyl)-2-sulfoacetamide (basis, 41.1% active) | 43.8 | |
| Sodium N-(1-tetradecyl)-2-sulfoacetamide (basis, 100% active) | | 18.0 |
| Coconut monoethanolamide | 5.1 | 5.1 |
| Ethyl alcohol | 12.0 | 12.0 |
| Water | 39.1 | 64.9 |
| Total | 100.0 | 100.0 |
| No. of plates washed at 10 gms./6 qts. of $H_2O$ (equiv. to 1.8 gms. active) in 120 p.p.m. $H_2O$ | 47 | 6 |

One of the most important and unpredictable properties of the sulfoacetamides of this invention is their unexpected solubility. While other sulfoalkanamides, such as the sulfopropionamides, can be employed in dilute concentrations as detergent active ingredients, the sulfopropionamides are not commercially practicable for the preparations of the liquid concentrates. It is the liquid detergent concentrates which have found greatest favor for dishwashing purposes. While the sulfoacetamides can be readily solubilized by the use of only moderate amounts of solubilizing agents, the corresponding sulfopropionamides form unpourable gels with the same or even greater amounts of solubilizing agents. As a consequence the latter cannot be prepared as liquid detergent concentrates of a potency sufficient to satisfy the established commercial uses of liquid concentrates. This significant difference in solubility is illustrated by the following example:

EXAMPLE 3

A preparation of sodium N-(2-tetradecyl)-sulfopropionamide was synthesized and recrystallized until a product of 100% purity was obtained.

A similar preparation of sodium N-(2-tetradecyl)-sulfoacetamide was prepared and recrystallized to a product having a purity of 94% active.

These two active ingredients were formulated into representative dishwashing formulations containing, in addition to the detergent active, cocomonoethanolamide and a vehicle composed of water and ethyl alcohol. In these typical dishwashing formulations, ethyl alcohol will function as a hydrotroping agent, enabling the solubilization of materials normally insoluble in pure water. The following tests were performed:

TABLE II

| Ingredients | Run 1 | 2 | 3 | 4 | 5 | 6 | 7 |
|---|---|---|---|---|---|---|---|
| Na-(2-tetradecyl)-sulfopropionamide (100% active), gm | | 1.80 | 1.80 | 1.80 | | | |
| Na-(2-tetradecyl)-sulfoacetamide (94% active), gm | 1.92 | | | | 2.44 | 1.92 | 2.44 |
| Cocomonoethanolamide (95% active), gm | 0.51 | 0.51 | 0.51 | 0.51 | 0.51 | 0.51 | 0.51 |
| Ethyl alcohol, gm | 1.20 | 1.20 | 2.40 | 3.60 | 1.20 | 0.80 | 0.80 |
| Water, gm | 6.37 | 6.49 | 12.98 | 19.45 | 5.85 | 6.77 | 6.25 |
| Total Ingredients, gm | 10.00 | 10.00 | 17.69 | 25.36 | 10.00 | 10.00 | 10.0 |
| Percent active | 18.0 | 18.0 | 10.2 | 7.1 | 22.0 | 18.0 | 22.0 |
| Percent alcohol | 12.0 | 12.0 | 13.6 | 14.2 | 12.0 | 8.0 | 8.0 |
| Clarity | (¹) | Heavy crystalline formation in less than 2 hours | | | Clear liquid after 1 year | | |

¹ Clear liquid after 1 year.

The results in the foregoing show that where sodium N-(2-tetradecyl)-sulfoacetamide is used as a detergent active ingredient, clear liquid formulations can be prepared having a high concentration—up to 22% active—and a relatively low concentration of alcohol—as little as 8%. On the other hand, where sodium N-(2-tetradecyl)-sulfopropionamide is used as a detergent active, the detergent formulation may contain as little as 7.1% active and as much as 14.2% alcohol, and it is still impossible to obtain clear homogeneous liquids which would be suitable for formulation as a liquid dishwashing detergent.

As will be apparent from the foregoing, in formulations representaative of those which might be encountered in commerce, there will be in the order of 18% to 22% active, i.e. the 2-tetradecyl sulfoacetamide. The amount of suds booster is shown for illustrative purposes at the 4.8% level. Commercially from 3% to 7% thereof may be used. Lauric diethanolamide may be used in lieu of cocomonoethanolamide. The alcohol used as a solubilizing agent in this example is present in proportions between 8% and 12%.

EXAMPLE 4

Similar results have been obtained employing substances other than ethyl alcohol (as employed in Example 3) to solubilize the sulfoalkanamide. These results set forth in Table III show that the sulfopropionamide is not easily soluble in various other solubilizing agents.

TABLE III

| Formula Designation | A | B | C | D |
|---|---|---|---|---|
| C₁₄ sulfoacetamide ¹ | | | | 22.0 |
| C₁₄ sulfopropionamide ² | 22.0 | 8.0 | 8.0 | |
| Coconut monoethanolamide ³ | 5.0 | | | 5.0 |
| Lauric diethanolamide ⁴ | | | 3.0 | |
| Na xylenesulfonate | | 12.0 | | 12.0 |
| Ethyl alcohol | | 3.0 | 3.0 | |
| Hexylene glycol | | 6.0 | 6.0 | |
| Sequestrene ⁵ | | 0.1 | 0.1 | |
| Water | 61.0 | 82.9 | 79.9 | 61.0 |
| | Solid | (⁶) | (⁶) | Clear |

¹ Column 1, line 19. R is C₁₂. C₁₂H₂₅CH(CH₃)-NH-CO-CH₂-SO₃Na.
² C₁₂HCH₂₅(CH₃)-NH-CO-CH₂CH₂-SO₃Na.
³ From coconut oil mixed fatty acids.
⁴ About 90% lauric, balance mostly myristic.
⁵ Tetrasodium ethylenediamine tetraacetate.
⁶ Thick layer of crystals.

We claim:

1. The compound N-(2-alkyl)-sulfoacetamide having the formula

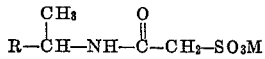

wherein R is a saturated straight chain aliphatic hydrocarbon radical having from 9 to 12 carbon atoms and M is a water solubilizing cation.

2. A compound according to claim 1 wherein R is C₁₂.

3. A process for preparing N-(2-alkyl)-sulfoacetamides comprising the steps of
   (a) reacting a halonitrile of the formula

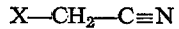

with an alpha-olefin of the formula RCH=CH₂ in the presence of concentrated sulfuric acid at a temperature of −5° to +10° C. and adding water thereto thereby to form an N-2-(alkyl)-haloacetamide of the formula

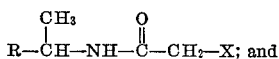

(b) reacting said N-(2-alkyl)-haloacetamide with an alkaline sulfite to convert it to the corresponding N-(2-alkyl)-sulfoacetamide;

in the foregoing formulas R being a straight chain aliphatic hydrocarbon radical having about 9 to 12 carbon atoms, and X being a halogen having an atomic weight between 35 and 127.

4. A process for preparing N-(2-alkyl)-sulfoacetamides comprising the steps of
   (a) reacting a chloronitrile of the formula

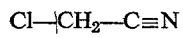

with an alpha-olefin of the formula RCH=CH₂ in the presence of concentrated sulfuric acid at a temperature of −5° to +10° C. and adding water thereto thereby to form an N-(2-alkyl)-chloroacetamide of the formula

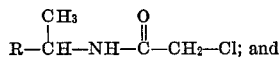

(b) reacting said N-(2-alkyl)-chloroacetamide with an alkaline sulfite to convert it to the corresponding N-(2-alkyl)-sulfoacetamide;

in the foregoing formulas R being a straight chain aliphatic hydrocarbon radical having about 9 to 12 carbon atoms.

References Cited

UNITED STATES PATENTS

| | | |
|---|---|---|
| 1,931,540 | 10/1933 | Hentrich et al. |
| 2,009,346 | 7/1935 | Schirm. |
| 2,573,673 | 10/1951 | Ritter _____ 260—552 |
| 3,170,951 | 2/1965 | Sheers et al. |

OTHER REFERENCES

Ritter et al.: J. Am. Chem. Soc. 74, 763–765 (1952).

DANIEL D. HORWITZ, Primary Examiner

U.S. Cl. X.R.

252—152; 260—561, 501.19

PO-1050
(5/69)

UNITED STATES PATENT OFFICE
CERTIFICATE OF CORRECTION

Patent No. 3,529,016      Dated September 15, 1970

Inventor(s) Arno Kahn and Mark D. Konort

It is certified that error appears in the above-identified patent and that said Letters Patent are hereby corrected as shown below:

Column 1, line 23, "pertedly" should be -- pectedly --;

Column 3, line 10, "amide" should be -- amides --;

line 22, "medum" should be -- medium --;

Column 5, line 60, "representaative" should be -- representative --;

Column 6, line 12, "HCH$_{25}$" should be -- H$_{25}$CH --.

SIGNED AND
SEALED
DEC 15 1970

(SEAL)
Attest:

Edward M. Fletcher, Jr.
Attesting Officer

WILLIAM E. SCHUYLER, JR.
Commissioner of Patents